United States Patent
Wilkin (10) Patent No.: US 9,718,322 B2
(45) Date of Patent: Aug. 1, 2017

(54) SHOCK ABSORBERS HAVING A COMPOSITE BASE ASSEMBLY WITH AN OVER-MOLDED CLOSURE INSERT

(71) Applicant: Tenneco Automotive Operating Company Inc., Lake Forest, IL (US)

(72) Inventor: Julien Wilkin, Fraiture (BE)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 0 days.

(21) Appl. No.: 14/952,058

(22) Filed: Nov. 25, 2015

(65) Prior Publication Data

US 2016/0144681 A1  May 26, 2016

Related U.S. Application Data

(60) Provisional application No. 62/084,779, filed on Nov. 26, 2014.

(51) Int. Cl.
*F16F 9/36* (2006.01)
*B60G 13/08* (2006.01)
*F16F 9/32* (2006.01)

(52) U.S. Cl.
CPC ............ *B60G 13/08* (2013.01); *F16F 9/3235* (2013.01); *B60G 2202/24* (2013.01); *B60G 2206/41* (2013.01)

(58) Field of Classification Search
CPC ........ F16F 9/062; F16F 9/3235; F16F 9/3236; F16F 9/3242; F16F 9/36; F16F 9/364; B29C 53/602
USPC ....................................... 188/322.16–322.17
See application file for complete search history.

(56) References Cited

U.S. PATENT DOCUMENTS 3,843,107 A * 10/1974 Atkins .................. F16F 9/3242
                                                              188/287
4,441,593 A    4/1984 Axthammer
(Continued)

FOREIGN PATENT DOCUMENTS

DE            4232136 A1    3/1994
DE      102006062414 A1    6/2008
(Continued)

OTHER PUBLICATIONS

English language abstract and machine-assisted English translation for DE4232136 extracted from espacenet.com database on Aug. 1, 2016, 9 pages.
(Continued)

*Primary Examiner* — Christopher Schwartz
(74) *Attorney, Agent, or Firm* — Howard & Howard Attorneys PLLC (57) ABSTRACT

A shock absorber having an inner assembly, a composite base assembly formed of a composite material and a closure insert formed of a metal material is disclosed. The inner assembly includes a pressure tube extending between first and second ends, a rod guide disposed adjacent to the first end, a compression valve disposed adjacent to the second end, a piston assembly disposed between the rod guide and the compression valve, and a rod operatively attached to the piston assembly and supported by the rod guide. The metal closure insert is operatively attached to the composite base assembly adjacent the rod guide such that the metal closure insert is at least partially connected to the composite base assembly. The metal closure insert supports at least one of the pressure tube and the rod guide with respect to the composite base assembly.

18 Claims, 7 Drawing Sheets

(56) References Cited

U.S. PATENT DOCUMENTS

| | | | |
|---|---|---|---|
| 4,589,528 A | | 5/1986 | Axthammer et al. |
| 4,749,071 A | * | 6/1988 | Taylor .................. B29C 53/602 |
| | | | 138/31 |
| 5,441,132 A | * | 8/1995 | Pradel .................. F16F 9/3242 |
| | | | 188/276 |
| 5,727,662 A | | 3/1998 | Guy et al. |
| 7,004,293 B2 | * | 2/2006 | Schurmans ............ F16F 9/062 |
| | | | 188/315 |
| 7,637,128 B2 | | 12/2009 | Kim |
| 8,297,418 B2 | * | 10/2012 | Bombrys .............. B60G 13/08 |
| | | | 188/275 |
| 8,434,772 B2 | * | 5/2013 | Keil ..................... F16F 9/3235 |
| | | | 188/315 |
| 2002/0063024 A1 | | 5/2002 | Ashiba et al. |
| 2003/0024780 A1 | * | 2/2003 | Yasuda .................. F16F 9/062 |
| | | | 188/322.17 |
| 2007/0051574 A1 | * | 3/2007 | Keil ....................... F16F 9/364 |
| | | | 188/322.18 |
| 2009/0026030 A1 | | 1/2009 | de Molina et al. |
| 2014/0202809 A1 | * | 7/2014 | Ozaki ....................... F16F 9/36 |
| | | | 188/322.17 |
| 2014/0262651 A1 | | 9/2014 | Luczak |
| 2016/0031282 A1 | | 2/2016 | Hernette et al. |
| 2016/0146285 A1 | | 5/2016 | Wilkin |

FOREIGN PATENT DOCUMENTS

| | | |
|---|---|---|
| DE | 102011076200 A1 | 11/2012 |
| DE | 102011087597 A1 | 6/2013 |
| DE | 102014007961 A1 | 12/2015 |
| EP | 2657565 A1 | 10/2013 |
| JP | H07-054986 | 2/1995 |
| JP | H11-244085 | 9/1999 |
| WO | 2005030506 A2 | 4/2005 |

OTHER PUBLICATIONS

Machine-assisted English translation for DE102014007961 extracted from espacenet.com database on Aug. 1, 2016, 16 pages.

English language abstract and machine-assisted English translastion for DE102011076200 extracted from espacenet.com database on Aug. 1, 2016, 10 pages.

English language abstract and machine-assisted English translation for DE102011087597 extracted from espacenet.com database on Aug. 1, 2016, 11 pages.

English language abstract and machine-assisted English translation for DE102006062414 extracted from espacenet.com database on Aug. 1, 2016, 12 pages.

International Search Report for Application No. PCT/US2015/062668 dated Feb. 5, 2016, 3 pages.

English language abstract and machine-assisted English translation for EP2657565A1 extracted from espacenet.com database on May 16, 2016, 8 pages.

English language abstract and machine-assisted English translation for JPH07-054896 extracted from the JPO database on Feb. 26, 2016, 10 pages.

English language abstract and machine-assisted English translation for JPH11-244085 extracted from the JPO database on Feb. 26, 2016, 12 pages.

* cited by examiner

SHOCK ABSORBERS HAVING A COMPOSITE BASE ASSEMBLY WITH AN OVER-MOLDED CLOSURE INSERT

CROSS REFERENCE TO RELATED APPLICATION

This application claims the benefit of U.S. Provisional Patent Application Ser. No. 62/084,779 filed Nov. 26, 2014, the contents of which is incorporated in its entirety by reference.

BACKGROUND OF THE INVENTION

1. Field of the Invention

The present invention relates generally to shock absorbers, and more specifically, to shock absorbers having a composite base assembly with an over-molded closure insert.

2. Description of the Related Art

Conventional shock absorbers known in the related art typically include an outer tube, a piston assembly, a rod, fluid, and one or more valves, whereby the piston assembly is connected to the rod and travels within fluid in the outer tube in operation so as to dampen axial movement of the rod with respect to the outer tube. To that end, respective opposing ends of the rod and outer tube are attached to different members or structures so as to dampen movement therebetween. By way of example, conventional automotive suspension systems utilize shock absorbers in connection with springs to control the suspension damping in compression and rebound, whereby the shock absorber is typically attached to a knuckle supporting a wheel at one end, and to a portion of the vehicle's frame or body at the other end.

Depending on the application, the shock absorber may also include an inner tube disposed inside the outer tube, wherein the piston assembly is instead supported in the inner tube. The shock absorber is sealed at an end that receives the piston assembly. The inner tube defines a working chamber filled with fluid through which the piston assembly can move in operation. Similarly, a reservoir chamber is defined in the space between the outer tube and the inner tube. The reservoir chamber also contains fluid and is in regulated fluid communication with the working chamber via one or more valves. The chambers are sealed to prevent the leakage of fluid therefrom. The outer tube is typically manufactured from steel and, consequently, can be heavy. Since the outer tube is manufactured from steel, the end of the outer tube is sealed by known methods, such as crimping or roll forming. The outer tube typically engages a rod guide assembly to seal the chambers. In an effort to reduce the weight of the outer tube, thin-walled steel or aluminum may be used. However, it will be appreciated that reducing the wall thickness of the outer tube or using aluminum will reduce the weight, which can lead to reduced strength.

Composite materials have increasingly been used in automotive applications to reduce weight. Thus, given the drawbacks of outer tubes manufactured from steel discussed above, it is desirable to manufacture the outer tube from a composite material. However, it will be appreciated that composites have significantly different material properties than those of metals. Particularly, composite materials have a lower stiffness and therefore have greater elongation than metals. Another drawback is the need to seal the shock absorber in such a manner to prevent fluid from escaping and to be sufficiently strong to withstand the preloaded forces and the external forces.

Typically, shock absorbers are assembled with an internal preload between the inner tube and the outer tube, so as to prevent the various components discussed above from coming lose in operation, and to help keep the piston assembly, rod, inner tube, and outer tube aligned in operation. Proper alignment ensures reduced friction and low noise in operation. Thus, it will be appreciated that axial rebound loading of the shock absorber may cause a composite outer tube to deform significantly, such that the preload discussed above would disappear and the various components could come loose, leading to increased noise and friction as well as decreased performance and component life.

Moreover, it will be appreciated that the flexibility and elongation of composite materials inherently makes attachment with metal components or assemblies more difficult during manufacturing and can necessitate fastening or securing features that are complex and expensive to manufacture. Moreover, all-metal shock absorbers are manufactured with well established processes, such as roll forming or crimping, using existing machinery unsuitable for use with composites. These manufacturing lines are very costly to install and have been developed over many years of refinement and the prior art composite assemblies do not allow for closure with the existing processes.

Each of the components of a shock absorber of the type described above must cooperate to effectively dampen axial movement in operation. While shock absorbers known in the related art have generally performed well for their intended purpose, there remains a need in the art for a shock absorber that has superior operational characteristics, performs reliably, and provides advantages relating to decreased weight.

SUMMARY OF THE INVENTION

The shock absorber of the present invention includes an inner assembly, a composite base assembly, and a closure insert formed of a metal material. The inner assembly includes a pressure tube extending between first and second ends, a rod guide disposed adjacent to the first end of the pressure tube, a compression valve disposed adjacent to the second end of the pressure tube, a piston assembly disposed in the pressure tube between the rod guide and the compression valve, and a rod operatively attached to the piston assembly and supported by the rod guide so as to concentrically align the rod with the pressure tube. The composite base assembly defines a chamber for at least partially accommodating the inner assembly therein. The metal closure insert is operatively attached to the composite base assembly adjacent the rod guide such that the metal closure insert is at least partially connected to the composite base assembly. The metal closure insert supports at least one of the pressure tube and the rod guide with respect to the composite base assembly.

The present invention overcomes the disadvantages associated with the related art shock absorbers. The shock absorber of the present invention enables a light-weight, composite base assembly to replace all-metal shock absorbers while, at the same time, maintaining the ability to assemble the shock absorber using existing manufacturing processes and equipment. Specifically, the metal closure insert has substantial strength to sealingly close the shock absorber and prevent any fluid from escaping therein, while simultaneously being able to be manufactured on existing equipment with existing processes. The metal closure insert is secured to the composite base assembly to withstand pull-out forces encountered during assembly and typical use of the vehicle.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
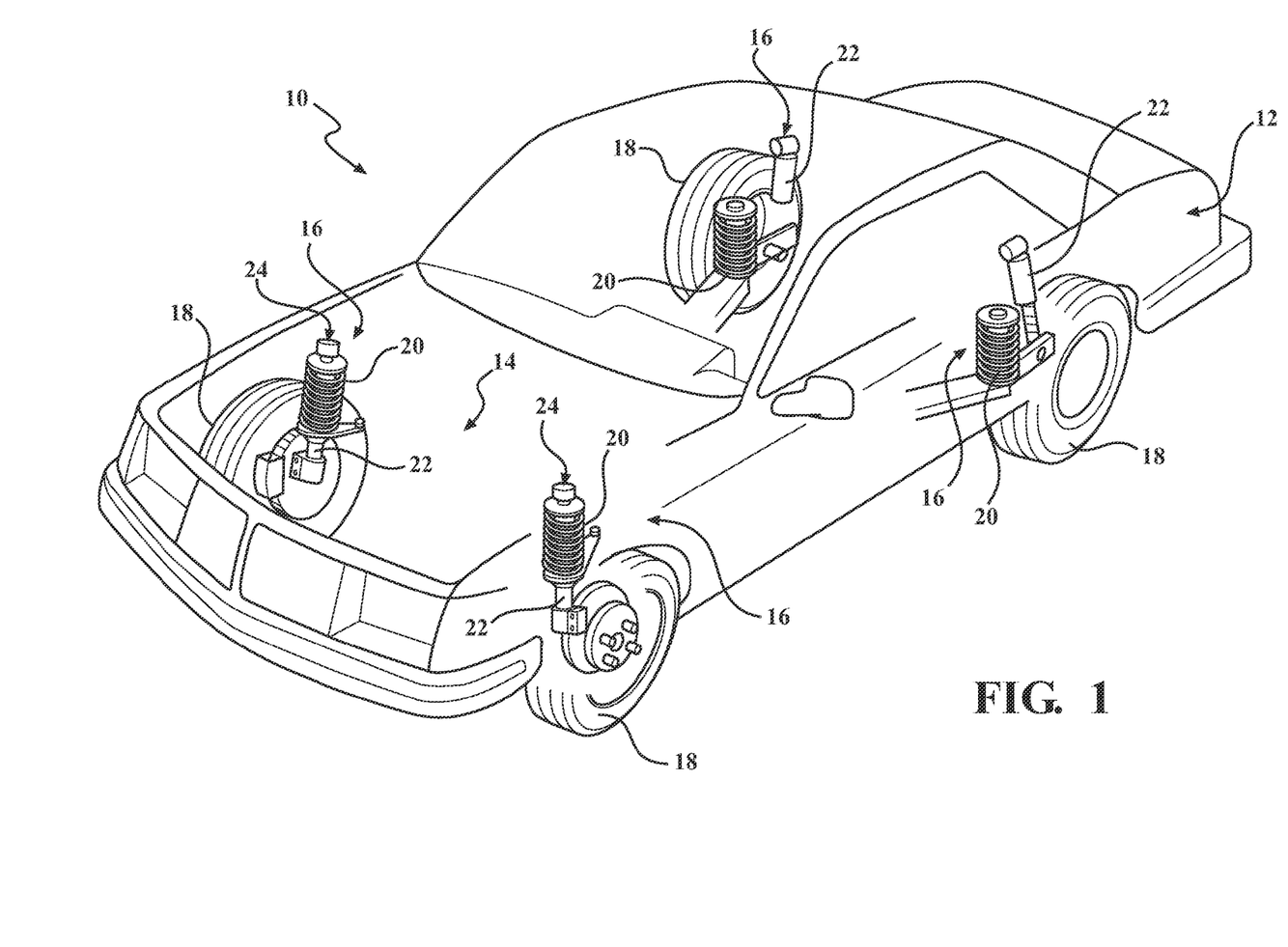
FIG. 1 is an enlarged perspective view of a generic vehicle showing a conventional suspension system.

With reference to the Figures, where like numerals are used to designate like structure throughout the several views, a portion of a conventional vehicle is illustrated at 10 in FIG. 1. The vehicle 10 includes a body 12 operatively attached to a suspension system 14 defined by four corner assemblies 16. The corner assemblies 16 are each assigned to a rotatably supported wheel 18 and are used to control the relative motion between the body 12 and wheels 18 in operation. To that end, the corner assemblies 16 each typically include a spring 20 to help absorb impacts, and a shock absorber 22 to help control motion of the spring 20 by damping movement between the wheel 18 and vehicle body 12.

As shown in FIG. 1, the springs 20 are compression springs and can be either concentrically aligned around the shock absorber 22, or spaced from the shock absorber 22. Thus, those having ordinary skill in the art will appreciate that the shock absorber 22 of the present invention can be used in connection with any suitable type of spring 20 without departing from the scope of the present invention. By way of non-limiting example, the spring 20 could be a leaf spring (not shown, but generally known in the art). Moreover, given the number of different suspension systems 14 known in the related art, it will be appreciated that any suitable number of shock absorbers 22 could be used with any suitable number of springs 20. Further, the shock absorber 22 of the present invention is not limited for use in automotive applications, and could be used in any suitable application without departing from the scope of the present invention. By way of non-limiting example, the shock absorber 22 of the present invention could be used in connection with passenger or commercial vehicles, motorcycles, all-terrain vehicles, lawn care equipment, heavy-duty trucks, trains, airplanes, ships, construction vehicles and equipment, military vehicles, or any other suitable application, suspension-based or otherwise, without departing from the scope of the present invention.

Figure 2:
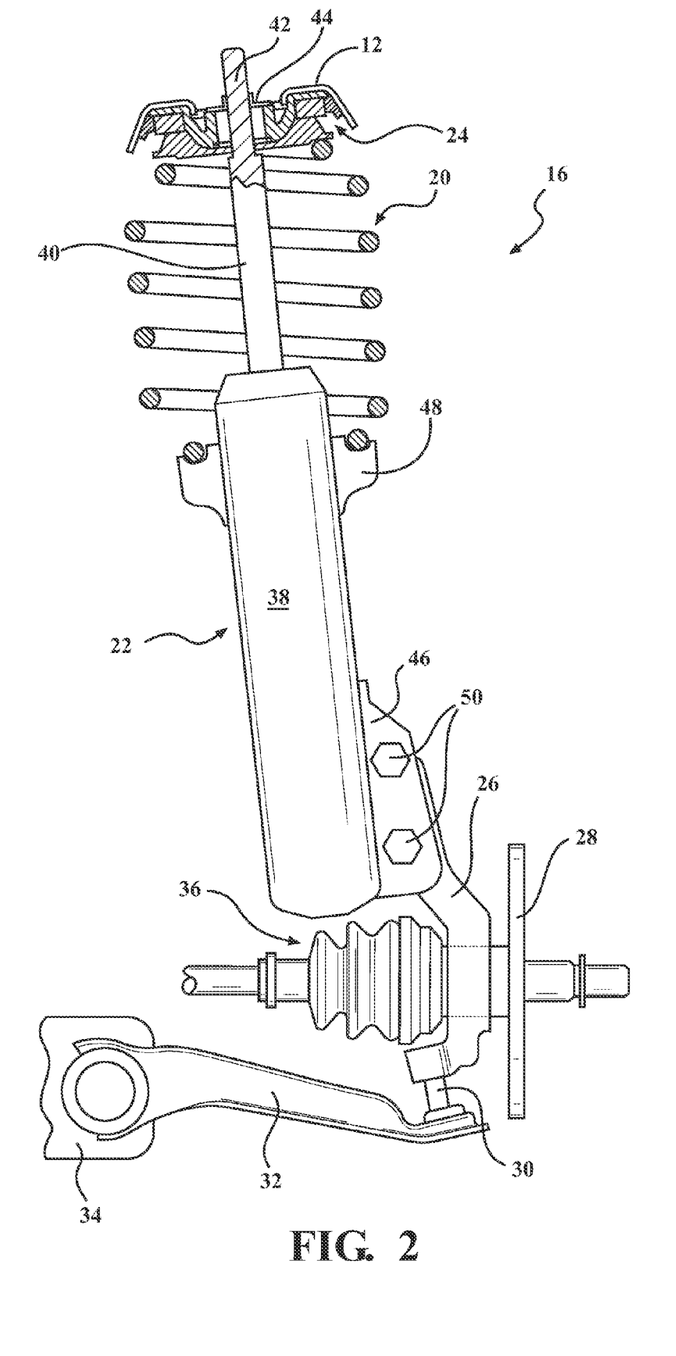
FIG. 2 is a partial sectional side view of a corner assembly of the suspension system of FIG. 1 having a conventional shock absorber.

Referring now to FIG. 2, a partial sectional view of a conventional corner assembly 16 of a vehicle suspension system 14 is shown for exemplary purposes. Those having ordinary skill in the art will recognize the corner assembly 16 depicted in FIG. 2 as a MacPherson strut system, which includes a strut-type shock absorber 22 used to control movement between the vehicle body 12 and wheel 18 (not shown in FIG. 2). The shock absorber 22 is typically mounted between a top mount assembly, generally indicated at 24, and a knuckle 26. The top mount assembly 24 mounts to the body 12 of the vehicle 10 and helps support the spring 20, as described in greater detail below. The knuckle 26 typically includes a rotatably supported hub and bearing assembly 28, to which the wheel 18 is operatively attached. The knuckle 26 is also typically connected to a ball joint 30 mounted to a lower control arm 32 which, in turn, is pivotally supported by a frame member 34 of the vehicle. A continuously-variable joint member 36 translates rotational torque from a transmission (not shown, but generally known in the art) to the wheel 18 via the hub and bearing assembly 28. Thus, the wheel 18 can rotate in operation to drive the vehicle 10, and the suspension system 14 described above absorbs impacts and allows the wheel 18 to move with respect to the body 12.

The strut-type shock absorber 22 shown in FIG. 2 includes a composite base assembly 38 and a rod 40 concentrically-aligned with and supported within the composite base assembly 38 as described in greater detail below. The rod 40 typically includes a stepped and threaded end 42 adapted to secure the shock absorber 22 to the top mount assembly 24 with a nut 44. However, it will be appreciated that the shock absorber 22 could be operatively attached to the top mount assembly 24, or to any suitable portion of the vehicle 10, or to any suitable member irrespective of the application, in any suitable way, without departing from the scope of the present invention. The top mount assembly 24 allows the strut 22 and knuckle 26 to rotate such that the wheel 18 can be turned as the vehicle 10 is driven.

The composite base assembly 38 has a mounting portion 46 adapted to attach the shock absorber 22 to the knuckle 26, and a spring seat 48 adapted to support the spring 20. While the composite base assembly 38 depicted in FIG. 2 is attached to the knuckle 26 with two bolts 50, those having ordinary skill in the art will appreciate that the composite base assembly 38 of the shock absorber 22 could be operatively attached to any suitable portion of the vehicle 10, or to any suitable member, in any suitable way, without departing from the scope of the present invention. Similarly, while the composite base assembly 38 depicted in FIG. 2 includes a spring seat 48, those having ordinary skill in the art will appreciate that the composite base assembly 38 of the shock absorber 22 could be configured to support the spring 20 in any suitable way, or not at all, without departing from the scope of the present invention.

Figure 3A:
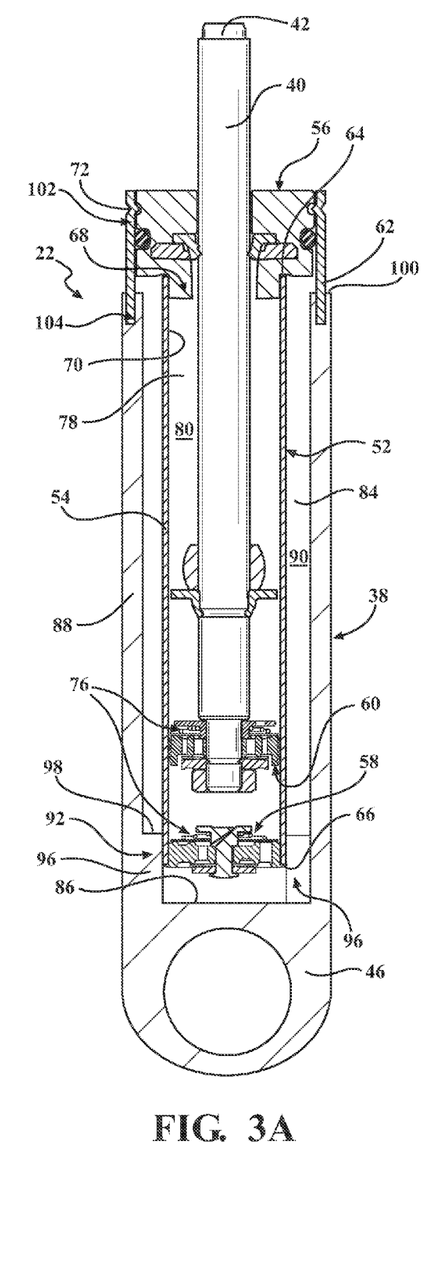
FIGS. 3A and 3B are sectional side views of shock absorbers having an inner assembly, a composite base assembly, and a closure insert, in assembled configurations.
Figure 3B:
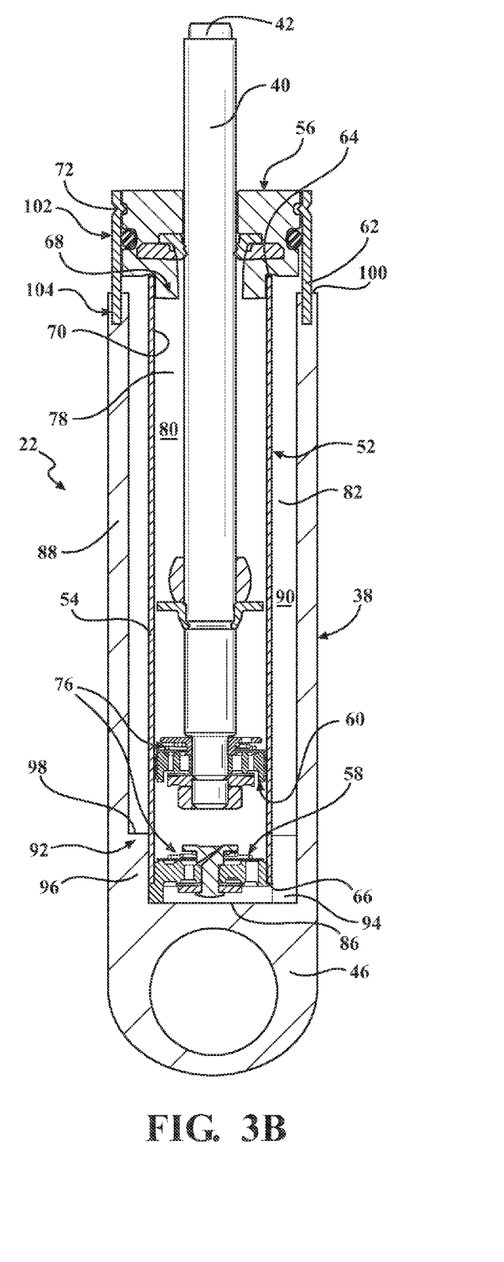
Figure 4:
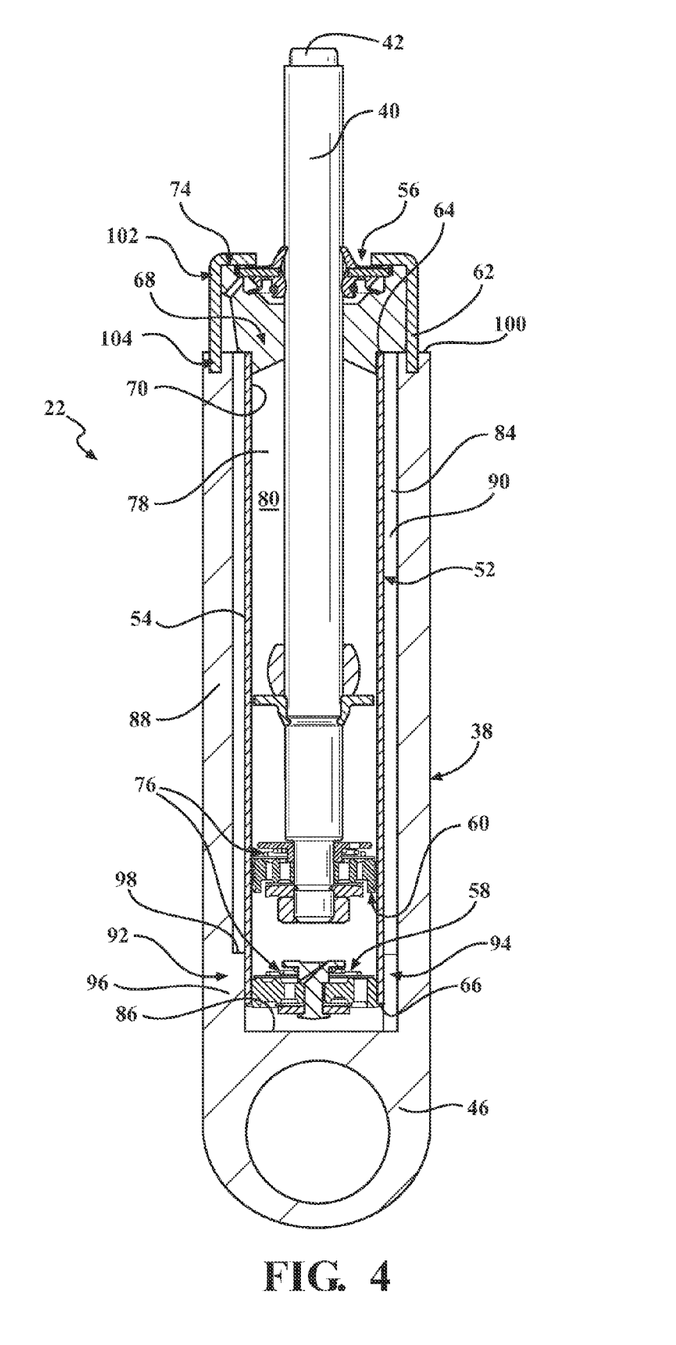
FIG. 4 is a sectional side view of a shock absorber according to one embodiment of the present invention having an inner assembly, a composite base assembly, and a closure insert, in an assembled configuration.

Referring now to FIGS. 3A, 3B, and 4, various embodiments of the shock absorber 22 of the presentation are shown. As will be appreciated from the discussion that follows, common reference will be made to the various components of the shock absorbers 22 for the purposes of clarity and consistency. The shock absorber 22 of the present invention includes an inner assembly 52 and the composite base assembly 38. The inner assembly 52 and composite base assembly 38 cooperate as described in greater detail below to define what is sometimes referred to in the related art as a "double tube" shock absorber 22. The inner assembly 52 includes a pressure tube 54, a rod guide 56, a compression valve 58, a piston assembly 60, and the rod 40 discussed above. The shock absorber 22 of the present invention also includes a closure insert 62 formed of a metal material operatively attached to the composite base assembly 38.

The pressure tube 54 of the inner assembly 52 extends between opposing first and second ends 64, 66. The rod guide 56 is disposed adjacent to the first end 64 of the pressure tube 54 and is used to concentrically align and constrain both the pressure tube 54 and the rod 40. The rod guide 56 typically defines a lower step 68 operatively engaged to the first end 64 of the pressure tube 54. More specifically, the lower step 68 engages both an inside surface 70 of the pressure tube 54 as well as the first end 64 of the pressure tube 54. However, those having ordinary skill in the art will appreciate that the rod guide 56 could be formed, shaped, or otherwise configured in any suitable way without departing from the scope of the present invention. Further, the rod guide 56 helps seal the shock absorber 22 so as to prevent escape of fluid (not shown, but typically realized as a non-compressible oil) as well as to block contaminants and debris from entering. The rod guide 56 is typically operatively attached to the metal closure insert 62 which, similarly, is operatively attached to the composite base assembly 38 as described in greater detail below. The rod guide 56 is typically concentrically aligned with the metal closure insert 62 and may be operatively attached thereto in any suitable way.

The metal closure insert 62 could be crimped to a slot 72 disposed in the rod guide 56 (see FIGS. 3A and 3B), or could be rolled (or "spun") onto a top surface 74 of the rod guide 56 (see FIG. 4) with the rod guide 56 also axially supported by the composite base assembly 38. Nevertheless, it will be appreciated that the rod guide 56 can be configured to attach to the composite base assembly 38 or the metal closure insert 62 in any suitable way without departing from the scope of the present invention.

The inner assembly 52 also includes a compression valve 58 disposed adjacent to the second end 66 of the pressure tube 54, and the piston assembly 60 disposed in the pressure tube 54 between the rod guide 56 and the compression valve 58, with the rod 40 operatively attached to the piston assembly 60 and supported by the rod guide 56 as discussed above. Both the piston assembly 60 and the compression valve 58 typically include valving, generally indicated at 76, to control the flow of fluid in operation. The pressure tube 54 defines a working chamber 78 in which the piston assembly 60 travels. The piston assembly 60 separates the working chamber 78 into an upper working chamber 80 disposed between the rod guide 56 and the piston assembly 60, and a lower working chamber 82 disposed between the piston assembly 60 and the compression valve 58. The rod 40 extends through the upper working chamber 80, but not the lower working chamber 82, thereby creating a differential volume of fluid to be displaced as the piston assembly 60 travels within the pressure tube 54.

The pressure tube 54 of the inner assembly 52 is substantially disposed within the composite base assembly 38. To that end, the composite base assembly 38 terminates at a floor 86 and has a wall 88 extending therefrom to define a chamber 84 for at least partially accommodating the inner assembly 52 therein. The second end 66 of the pressure tube 54 may be spaced from the floor 86, as shown in FIGS. 3A and 4. In such embodiments, the compression valve 58 may be further secured into the second end 66 of the pressure tube 54 by a mechanical connection, such as welding or crimping, if needed. The chamber 84 is larger in diameter than the pressure tube 54 of the inner assembly 52, defining a reservoir chamber 90 between the chamber 84 and the pressure tube 54. The reservoir chamber 90 is in fluid communication with the working chamber 78 of the pressure tube 54 and is adapted to store additional fluid necessitated by the differential volume of fluid caused by the presence of the rod 40 in the upper working chamber 80 of the pressure tube 54, as discussed above. While the chamber 84 of the composite base assembly 38 has a cylindrical profile, those having ordinary skill in the art will appreciate that the chamber 84 could have any suitable profile or shape, or be of any suitable size or configuration sufficient to at least partially accommodate the inner assembly 52, without departing from the scope of the present invention. FIG. 3B shows another embodiment of the subject invention having the compression valve 58 in contact with the floor and the second end 66 of the pressure tube 54 abutting the compression valve 58.

As shown best in FIGS. 3A, 3B, and 4, in one embodiment, the composite base assembly 38 may include a lower element 92 disposed adjacent to the floor 86 that partially engages the second end 66 of the pressure tube 54 of the inner assembly 52 and may define at least one gap 94 for facilitating fluid communication between the pressure tube 54 and the chamber 84. The lower element 92 maintains the alignment between the inner assembly 52 and the composite base assembly 38 as described in co-pending U.S. Provisional Application No. 62/084,771, which is incorporated herein by reference. The gap 94 allows fluid to flow from the lower working chamber 82 of the pressure tube 54, via the compression valve 58, to the reservoir chamber 90 discussed above. The lower element 92 is formed as a plurality of radially-spaced retainers 96.

The composite base assembly 38 of the present invention supports the inner assembly 52 and is formed from a composite material. In the embodiment shown herein, the composite base assembly 38 of the shock absorber 22 of the present invention is a unitary, one-piece component manufactured from a thermosetting fiber-filled polymer. More specifically, the thermoset material has glass filler strands approximately 1.5-3.0 CM in length. By way of non-limiting example, vinylester resin with 35 to 40% glass fiber may be used. However, those having ordinary skill in the art will appreciate that the composite base assembly 38 could be manufactured from any suitable composite material, using any suitable type or amount of reinforcing fiber or filler, using any suitable manufacturing process, without departing from the scope of the present invention. Similarly, it will be appreciated that the composite base assembly 38 could be manufactured as or from any suitable number of discrete or congruent merging components, structures, or features, operatively attached to each other in any suitable way, without departing from the scope of the present invention.

Those having ordinary skill in the art will appreciate that conventional composite materials of the kind used to manufacture the composite base assembly 38 typically have significantly different properties than those of the metals used to manufacture the components of the inner assembly 52, as discussed above. As shown in FIGS. 3-7, the metal closure insert 62 is operatively attached to the composite base assembly 38 adjacent to a proximal surface 100. The composite base assembly 38 is manufactured by applying composite material around the metal closure insert 62, which subsequently cures, sets, or otherwise hardens around the metal closure insert 62 such that the metal closure insert 62 is prevented from translating with respect to the composite base assembly 38. The steel insert 62 is placed in the mold before closing and then held in place during the resin injection and curing process.

The metal closure insert 62 supports at least one of the pressure tube 54 and the rod guide 56 with respect to the composite base assembly 38. As noted above, the metal closure insert 62 is configured to be attached to, or engage, the rod guide 56 by any suitable known industrial process, such as those conventionally used to assemble all-metal shock absorbers 22. Specifically, the metal closure insert 62 may be mechanically crimped or spun after the inner assembly 52 is installed (compare FIG. 4 to FIGS. 3A and 3B), which secures the rod guide 56 in place. However, those having ordinary skill in the art will appreciate that the metal closure insert 62 could be operatively attached to any other suitable part of the shock absorber 22, in any suitable way, without departing from the scope of the present invention.

Figure 5:
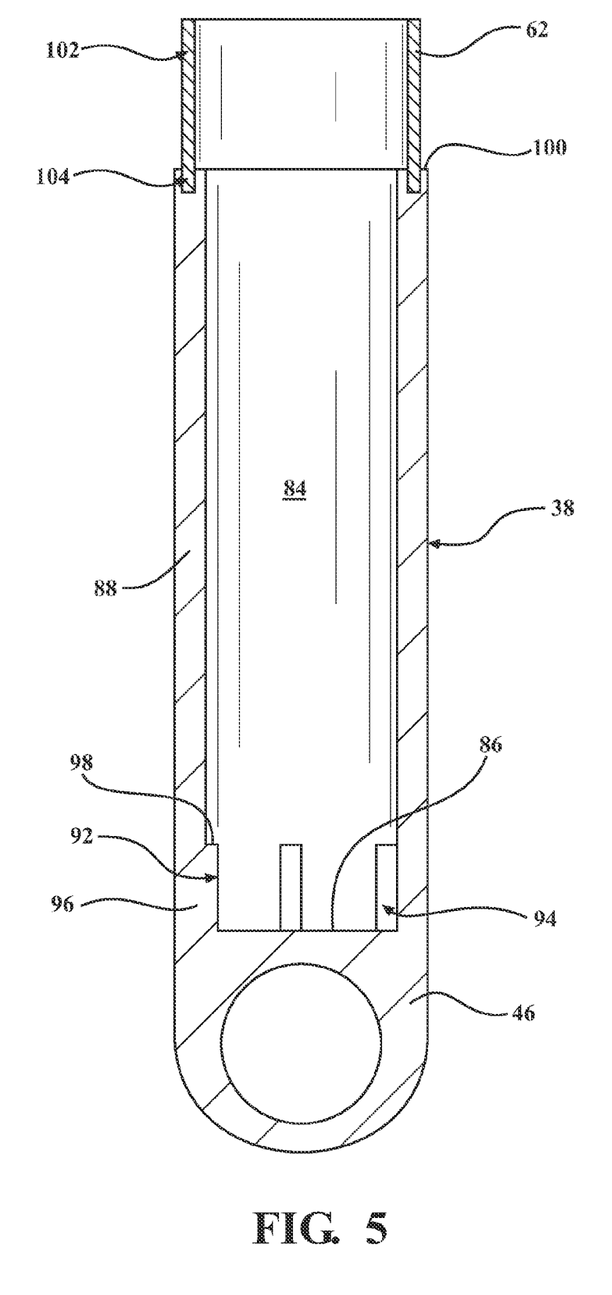
FIG. 5 is an enlarged side sectional view of the composite base assembly and closure insert of FIGS. 3 and 4 in a pre-assembly configuration.

Referring now to FIG. 5, in one embodiment, the metal closure insert 62 has a cylindrical profile and is aligned concentrically to the composite base assembly 38 such that the metal closure insert 62 is at least partially connected to the composite base assembly 38. The metal closure insert 62 is embedded into the composite base assembly 38 such that one end remains exposed while the other end is disposed within the composite base assembly 38. In one method, the metal closure insert 62 is molded into the composite base assembly 38, while the composite base assembly 38 is being formed, such that the metal closure insert 62 is disposed above and below the proximal surface 100 of the composite base assembly 38. The metal closure insert 62 has an upper attachment portion 102, which is exposed, and a lower embedded portion 104, which is disposed in the composite base assembly 28.

Figure 6:
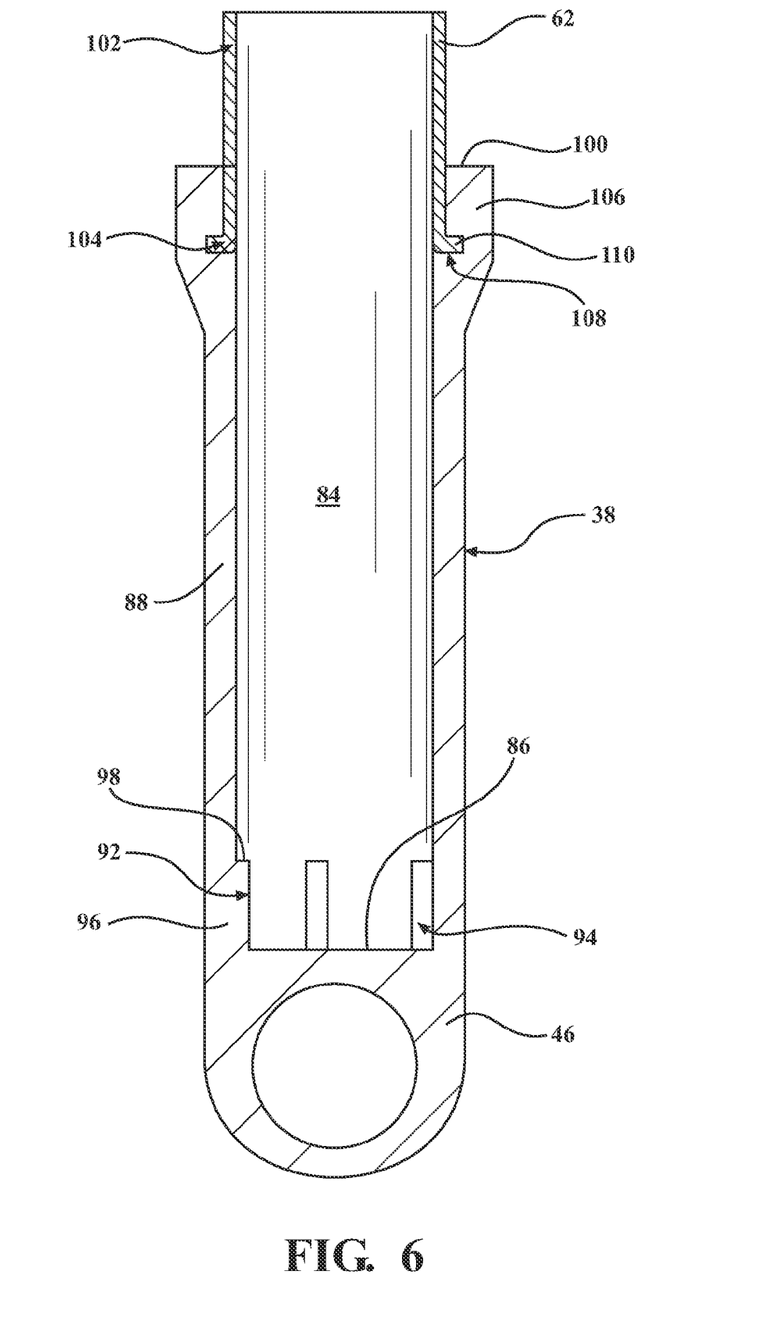
FIG. 6 is an enlarged side sectional view of another embodiment of the composite base assembly and closure insert of FIG. 5 in a pre-assembly configuration.

With reference to FIG. 6, the composite base assembly 38 may be formed to include an upper support section 106 adjacent the proximal surface 100 to cooperate with the lower mating portion 104 of the metal closure insert 62. The upper support section 106 has a wall thickness greater than the wall 88 of the composite base assembly 38. As shown, the upper support section 106 of the composite base assembly 38 has a tapered profile. The additional composite material in the upper support section 106 provides additional strength for the closure insert 62.

Figure 7:
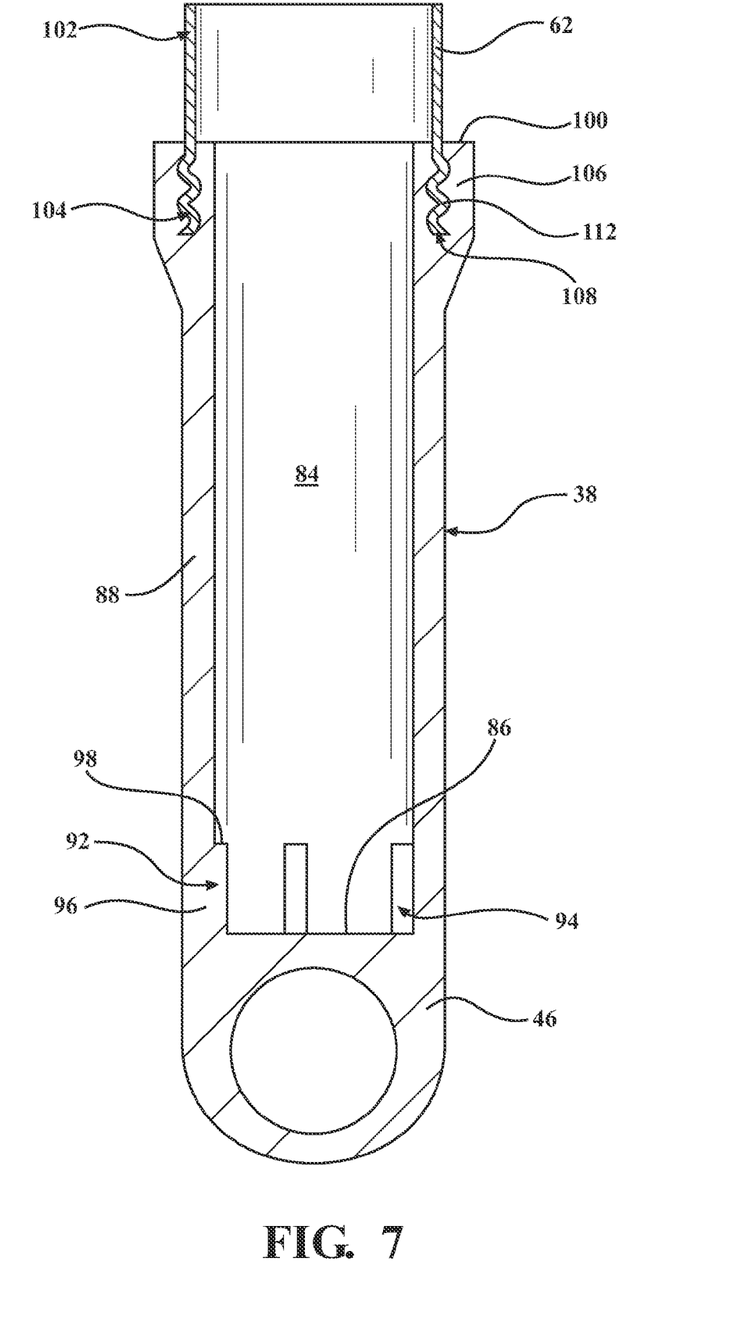
FIG. 7 is an enlarged side sectional view of yet another embodiment of the composite base assembly and closure insert of FIG. 5 in a pre-assembly configuration.

In FIGS. 6 and 7, the lower mating portion 104 of the metal closure insert 62 may include a retention feature 108 to strengthen the connection to the composite base assembly 38. The retention feature 108 can be realized in a number of different ways, depending on the specific application of the shock absorber 22. By way of non-limiting example, the retention feature 108 could be formed as a lip 110 (see FIG. 6) or wave or ribs 112 (see FIG. 7). The retention feature 108 permits the metal closure insert 62 to have strengths comparable to all-metal base assemblies. In other words, the closure insert 62 should withstand typical forces that a vehicle would be expected to encounter. It will be appreciated that the metal closure insert 62 and retention feature 108 can cooperate with the composite base assembly 38 to enable the use of differently designed inner assemblies 52 or components thereof. Specifically, as shown in FIG. 6, the lip 110 retention feature 108 can be configured such that the metal closure insert 62 is sized to the chamber 84 of the composite base assembly 38, thereby providing a substantially seamless transition between metal and composite adjacent the chamber 84. Nevertheless, those having ordinary skill in the art will appreciate that the retention feature 108 of the metal closure insert 62 could be formed in any suitable way, or could be omitted entirely, without departing from the scope of the present invention.

The subject invention provides the retention feature 108 that achieves acceptable results and meets the demanding requirements, while still remaining cost effective. The acceptable results can be demonstrated by Finite Element Analysis comparing the strength of the retention feature 108. While the strength must be sufficient to withstand typical forces encountered by the vehicle, it has been advantageously determined that 25 kN is one particular target strength that the metal closure insert 62 with retention feature 108 should withstand. The test applies a force to the metal closure insert 62 longitudinally to the composite base assembly 38 while supporting the bottom of the composite base assembly 38. The strength measured is the amount of force applied until the metal closure insert 62 fails. The embodiments disclosed in the Figures exceeded 25 kN and showed strengths of from 32-40 kN.

The various components of the shock absorber 22 of the present invention cooperate to effectively dampen axial movement in operation. Moreover, the metal closure insert 62 of the present invention allows shock absorbers 22 with composite base assemblies 38 to be assembled using industrial machinery and processes used in connection with conventional all-metal shock absorbers 22. Further, the shock absorber 22 of the present invention significantly reduces the weight of suspension systems 14, in that lightweight composite materials can be used to manufacture shock absorbers 22. Another advantage is that other components, such as a spring seat or a bracket can be molded together with the composite base assembly instead of made separately and then joined (welded, or press fitted) to the base assembly.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A shock absorber comprising:
an inner assembly including:
a pressure tube extending between first and second ends,
a rod guide disposed adjacent to said first end of said pressure tube,
a compression valve disposed adjacent to said second end of said pressure tube,
a piston assembly disposed in said pressure tube between said rod guide and said compression valve, and
a rod operatively attached to said piston assembly and supported by said rod guide so as to concentrically align said rod with said pressure tube;
a composite base assembly having a floor and a wall extending from said floor defining a chamber for at least partially accommodating said inner assembly therein and being formed of a composite material; and
a closure insert formed of a metal material and operatively attached to said composite base assembly such that said metal closure insert has one end disposed within said composite base assembly and another end extending from said composite base assembly for securing at least one of said pressure tube and said rod guide with respect to said composite base assembly.

2. The shock absorber as set forth in claim 1, wherein said metal closure insert includes a retention feature disposed at least partially within said composite base assembly adjacent to said rod guide.

3. The shock absorber as set forth in claim 2, wherein said composite base assembly further includes an upper support section adjacent said retention feature.

4. The shock absorber as set forth in claim 3, wherein said upper support section has a tapered profile.

5. The shock absorber as set forth in claim 3, wherein said upper support section has a thickness larger than said wall extending from said floor.

6. The shock absorber as set forth in claim 2, wherein said retention feature is further defined as a lower lip extending outwardly from said metal closure insert.

7. The shock absorber as set forth in claim 2, wherein said retention feature is further defined as a wave.

8. The shock absorber as set forth in claim 2 wherein said closure insert is concentrically aligned with said composite base assembly.

9. The shock absorber as set forth in claim 1, wherein said metal closure insert is made from a ductile metal.

10. The shock absorber as set forth in claim 9, wherein said ductile metal is one of a steel alloy, stainless steel, or aluminum.

11. The shock absorber as set forth in claim 1, wherein said metal closure insert is overmoulded into said composite base assembly.

12. The shock absorber as set forth in claim 1, wherein said metal closure insert is embedded into said composite base assembly.

13. A composite base assembly comprising:
   a floor;
   at least one wall extending from said floor defining a chamber for at least partially accommodating an inner assembly therein and being formed of a composite material; and
   a closure insert formed of a metal material and operatively attached to said composite base assembly having one end at least partially disposed within said composite base assembly and another end extending therefrom for engaging a rod guide such that said metal closure insert is capable of sealingly closing said chamber when engaging the rod guide.

14. The composite base assembly as set forth in claim 13, wherein said metal closure insert includes a retention feature disposed at least partially within said composite base assembly for securing thereto.

15. The composite base assembly as set forth in claim 14, wherein said retention feature is further defined as a lower lip extending outwardly from said closure insert.

16. The composite base assembly as set forth in claim 14, wherein said retention feature is further defined as a wave.

17. The composite base assembly as set forth in claim 13, wherein said metal closure insert is overmoulded into said wall.

18. The composite base assembly as set forth in claim 13, wherein said metal closure insert is embedded into said wall.

* * * * *